(12) United States Patent
Boka et al.

(10) Patent No.: US 12,403,918 B2
(45) Date of Patent: Sep. 2, 2025

(54) APPARATUS FOR VALIDATING A POSITION OR ORIENTATION OF A SENSOR OF AN AUTONOMOUS VEHICLE

(71) Applicant: KNORR-BREMSE Systeme für Nutzfahrzeuge GmbH, Munich (DE)

(72) Inventors: Jeno Boka, Dunakeszi (HU); Zsolt Dudas, Szeged (HU); Tamas Gyenis, Budapest (HU); Laszlo Lindenmaier, Budaors (HU); Huba Nemeth, Budapest (HU); Szabo Lorant, Kecskemet (HU); Andras Szappanos, Budajeno (HU); Adam Szoellosi, Budapest (HU); Daniel Voeroes, Budapest (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 149 days.

(21) Appl. No.: 18/008,822

(22) PCT Filed: May 21, 2021

(86) PCT No.: PCT/EP2021/063647
§ 371 (c)(1),
(2) Date: Dec. 7, 2022

(87) PCT Pub. No.: WO2021/249747
PCT Pub. Date: Dec. 16, 2021

(65) Prior Publication Data
US 2023/0242132 A1    Aug. 3, 2023

(30) Foreign Application Priority Data

Jun. 8, 2020 (EP) ..................... 20178711

(51) Int. Cl.
*B60W 50/02* (2012.01)

(52) U.S. Cl.
CPC ... *B60W 50/0205* (2013.01); *B60W 2300/125* (2013.01); *B60W 2420/403* (2013.01);
(Continued)

(58) Field of Classification Search
None
See application file for complete search history.

(56) References Cited

U.S. PATENT DOCUMENTS 5,850,254 A     12/1998  Takano et al.
8,373,763 B2 *   2/2013  Zhang ...................... G06T 7/80
                                                       348/176

(Continued)

FOREIGN PATENT DOCUMENTS

CN    109101011 A    12/2018
EP    0691599 B1 *   1/2000
(Continued)

OTHER PUBLICATIONS

Japanese-language Office Action issued in Japanese Application No. 2022-575379 dated Jan. 4, 2024 with English translation (9 pages).
(Continued)

*Primary Examiner* — James J Lee
*Assistant Examiner* — Andrew Sang Kim
(74) *Attorney, Agent, or Firm* — Crowell & Moring LLP

(57) ABSTRACT

An apparatus for validating a position or an orientation of one or more sensors of an autonomous vehicle is provided. The one or more sensors provide consecutive sensor data of surroundings of the vehicle. The apparatus includes a validation module, which is configured to compare the consecutive sensor data and to validate a position or an orientation of at least one sensor of the one or more sensors, based on a deviation in the consecutive sensor data.

10 Claims, 3 Drawing Sheets

(52) U.S. Cl.
CPC ... *B60W 2420/408* (2024.01); *B60W 2420/54* (2013.01); *B60W 2552/53* (2020.02)

(56) References Cited

U.S. PATENT DOCUMENTS

| | | |
|---|---|---|
| 2006/0184297 A1 | 8/2006 | Higgins-Luthman |
| 2008/0036866 A1 | 2/2008 | Sogawa et al. |
| 2011/0090339 A1* | 4/2011 | Higgins-Luthman ..... B60R 1/23 348/148 |
| 2018/0362051 A1 | 12/2018 | Hu |
| 2020/0019160 A1* | 1/2020 | McArthur ........... G01S 7/52004 |

FOREIGN PATENT DOCUMENTS

| | | |
|---|---|---|
| EP | 1 089 054 A2 | 4/2001 |
| JP | 8-16999 A | 1/1996 |
| JP | 2001-91984 A | 4/2001 |
| JP | 2018-88043 A | 6/2018 |

OTHER PUBLICATIONS

English Translation of International Search Report (PCT/ISA/210) issued in PCT Application No. PCT/EP2021/063647 dated Jun. 22, 2021 (two (2) pages).

English-language Written Opinion (PCT/ISA/237) issued in PCT Application No. PCT/EP2021/063647 dated Jun. 22, 2021 (six (6) pages).

Extended European Search Report issued in European Application No. 20178711.6 dated Nov. 6, 2020 (eight (8) pages).

Chinese-language Office Action issued in Chinese Application No. 202180041432.5 dated Apr. 18, 2025, with English translation (17 pages).

* cited by examiner

APPARATUS FOR VALIDATING A POSITION OR ORIENTATION OF A SENSOR OF AN AUTONOMOUS VEHICLE

BACKGROUND AND SUMMARY OF THE INVENTION

The present invention relates to an apparatus and a method for validating a position or orientation of a sensor of an autonomous vehicle, a vehicle comprising one or more sensors and said apparatus, and in particular to on-the-fly sensor position validation.

In order to perform autonomous or automatic driving tasks, vehicles generically possess a range of sensors adapted to perceive some aspects of the surroundings. Such sensors can include cameras facing in a particular direction (as e.g. rear-facing mirror replacement cameras, forward- or downward-facing cameras) or providing a surround view, thermal sensors like infrared or night vision cameras, and time-of flight sensors like radar or lidar devices.

A correct position or orientation of these sensors is essential for a reliable performance. Generally, sensors are calibrated and re-calibrated at specific points in time, and their operation depends on a persistence of the alignment assumed during a calibration process. If e.g. a camera is unintentionally moved, its extrinsic calibration parameters will cease to be acceptable. A change in sensor position or orientation can occur fast, e.g. as a result of minor collisions of the vehicle or the camera mount, or slow, as e.g. due to imperfect mounting or vibrations. In either case the respective sensor may continue providing data, which when the deficiency goes unnoticed can result in irregularities, errors, and possibly failures of the autonomous or automatic tasks the sensor data are collected for.

For these reasons there is a demand for a system able to perform a sensor position or orientation validation. Advantageously, such a system would not require an installation of further sensors, or of further physical appliances in the autonomous vehicle.

At least some of these problems are addressed by a system of the claimed invention.

The present invention relates to an apparatus for validating a position or orientation of one or more sensors of an autonomous vehicle, wherein the one or more sensors provide consecutive sensor data of surroundings of the vehicle. The apparatus comprises a validation module, configured to compare the consecutive sensor data and to validate a position or orientation of at least one sensor of the one or more sensors based on a deviation in the consecutive sensor data.

The precise nature of the sensors is not relevant for the principle according to which this apparatus operates. Rather, the sensor data may be obtained from detections in all ranges of electromagnetic frequencies (such as optical, infrared, or radio) or acoustic frequencies (such as ultrasound). The adjective consecutive is understood broadly, and may e.g. pertain to occasional, discretely repeated, or continuous. The validation module may compare sensor data for one sensor individually, and/or across different sensors, and for specific and/or different times, in which case the validation module will advantageously be configured to store and retrieve at least a part of the sensor data. A deviation in the sensor data may be any difference in sensor data created at different times and/or provided by different sensors, and carrying information about a position or orientation of one of the sensors. A validation of a position or orientation can have a binary outcome (sensor in position/sensor out of position), or lead to a more detailed result (e.g. an angle detailing a present orientation of a sensor). The validation may involve a threshold and/or a predefined tolerance, and/or yield an estimate for a severeness of the sensor displacement. Comparison and/or validation may be performed e.g. continuously, upon arrival of new sensor data, upon request by a driver or another system in the vehicle, and/or according to some regular time schedule. In validating the position, the validation module may e.g. be configured to assume that the first sensor data captured after the vehicle is started are still derived in a correct position, and to compare subsequent sensor data with these initial data. Embodiments may also specify that data stored for comparison is subjected to regular updates.

Optionally, however, the consecutive sensor data can include calibration data indicating a correct position or orientation of a sensor, in which case the validation module can be configured to compare present sensor data with the calibration data.

Calibration data are generated in a calibration process. An advantage of holding calibration data is that a slow deterioration (e.g. over several days) can be detected, even if the vehicle has not been in operation; if such calibration data are present, the validation module may therefore be configured to either store and/or retrieve this data for comparison.

Optionally the validation module is configured to compare the consecutive sensor data by a component including a localization of a pattern in surroundings of the sensor.

A localization of a pattern can be achieved by a standard pattern recognition algorithm. Patterns whose comparison is suitable for the validation of a position or orientation of a sensor could include features at fixed positions on the vehicle, but also—in particular when the vehicle is standing—off the vehicle. If a feature is contained in data provided by several sensors, a deviation of a localization of this feature in the data provided by one sensor relative to localizations provided by one or advantageously more than one other sensor may also be employed for validation. This may also comprise a comparison of differences of localizations over time.

Optionally, the validation module is configured to localize a pattern which is a structural feature of the vehicle. In particular, such a pattern may be a fixed point also employed in a calibration of sensors, a part of its shape like e.g. a position of an edge, a mirror, or a groove, another sensor, a light, or design elements like writing or distinctly colored areas.

In particular, all camera types including thermal range cameras in all positions can be validated individually where the truck intersects the feed. Cross calibration validation of sensors is also possible offline and online. For example, a lidar sensor may be cross-checked with a visible light camera, which can be performed by lidar point-cloud clustering, segmentation and frame backprojection.

Optionally, if the vehicle is a commercial vehicle comprising a cabin on a vehicle frame, the validation module is configured to compare consecutive sensor data by localizing a structural feature on the cabin for a sensor positioned on the cabin, and of a structural feature on the vehicle frame for a sensor positioned on the vehicle frame.

The cabin (or cab) may, in particular, be air suspended on the frame (e.g. via air bellows). In such a case, the cabin can move with respect to the vehicle frame. Often sensors dedicated to detect a pose of the vehicle, like e.g. lidar or radar sensors, are positioned on the vehicle frame, while e.g. sensors for mirror replacement are rigidly attached to the cabin. In order to circumvent the effects due to the relative motion of cabin and vehicle frame, the validation module may take into account the respective position of the sensor when validating changes in the sensor data.

Optionally, if the vehicle is a commercial vehicle comprising a towing vehicle on a trailer, the validation module is configured to localize a structural feature on the towing vehicle for a sensor positioned on the towing vehicle, and a structural feature on the trailer for a sensor positioned on the trailer.

This may again be advantageous due to relative motion of the towing vehicle with respect to the trailer, in particular while the commercial vehicle is operated.

Optionally the validation takes into account a driving situation of the vehicle, and the pattern is a road marking (like e.g. a driving lane marking), a traffic barrier (like a crash or guard rail, or a bollard), a curb, or a traffic light.

Autonomous vehicles often distinguish operation between different driving situations, and situations like e.g. that of a commercial vehicle on a motorway, or the vehicle waiting at a traffic light can be stable enough for the validation module to perform a calibration assessment. Such a situation may in particular be employed for performing cross calibrations between sensors observing the same feature or pattern.

Optionally, if the vehicle comprises at least two sensors, and the validation module is configured to compare the consecutive sensor data provided by one of the two sensors with the consecutive sensor data provided by the other of the two sensors.

As mentioned above, such a cross calibration may be performed if the two sensors detect a common feature, object, or pattern in their respective fields of view. It may also be employed for different types of sensors, as e.g. a cross-check between a lidar sensor and a visible light camera, which may involve techniques like lidar point cloud clustering, suitable segmentation, and frame backprojection.

Optionally, if the vehicle comprises multiple sensors, the validation module is configured to validate a position or orientation of one sensor of the multiple sensors by sensor data of another sensor of the multiple sensors.

This may in particular be beneficial if, for some reason, the one sensor does not produce adequate sensor data, as in situations where the sensor is severely misaligned or has fallen off. Typical sets of multiple sensors on autonomous vehicles suitable for such a procedure include surround view systems, or sensors which are redundant e.g. for safety reasons.

Embodiments also refer to a vehicle comprising one or more sensors for providing consecutive sensor data of surroundings of the vehicle in order to perform automated driving tasks, and an apparatus according to the above description.

Optionally, the vehicle is a commercial vehicle.

Optionally, sensors of the vehicle comprise one or more of the following:
- a mirror replacement or back-facing sensor (e.g. camera),
- a downward-facing camera,
- a front-facing camera,
- a side-facing camera,
- a surround-view camera,
- a radar sensor,
- a lidar sensor,
- an ultrasonic sensor.

In a commercial vehicle, mirror replacement and downward-facing cameras are typically positioned on a cabin, while radar, lidar and ultrasonic sensors are installed on the vehicle frame. Back-facing and downward-facing sensors in particular can also exist on a trailer. An apparatus positioned on a trailing vehicle may be configured to automatically detect sensors on a trailer and access their data stream if the trailer is attached to the trailing vehicle.

The present invention also relates to a method for validating a sensor position of an autonomous vehicle, with the vehicle comprising one or more sensors for providing consecutive sensor data of surroundings of the vehicle. The method is characterized by the following steps:
- comparing consecutive sensor data;
- validating a position or orientation of at least one of the one or more sensors based on a deviation in the consecutive sensor data.

The method can be applied for most environment perception sensors having the ego vehicle in their respective fields of view, as for example rear-looking (e.g. mirror replacement) cameras, downward-looking surround view cameras, thermal cameras, and/or time-of-flight sensors like e.g. lidar or radar devices.

The method validates sensor position for trucks or trailers by detecting changes that are due to sensor position changes. After detecting sensor dislocation, a warning can be issued to correct the sensor setup by the driver or a workshop.

The present invention furthermore relates to a computer product with software code on it, wherein the software code is adapted such that when processed by a data processing system, the data processing system performs the method described above.

In particular, embodiments of the present invention may be implemented by software in or a software module of an ECU.

Some examples of the systems and/or methods will be described in the following by way of examples only, and with respect to the accompanying figures.

DETAILED DESCRIPTION OF THE DRAWINGS

Figure 1:
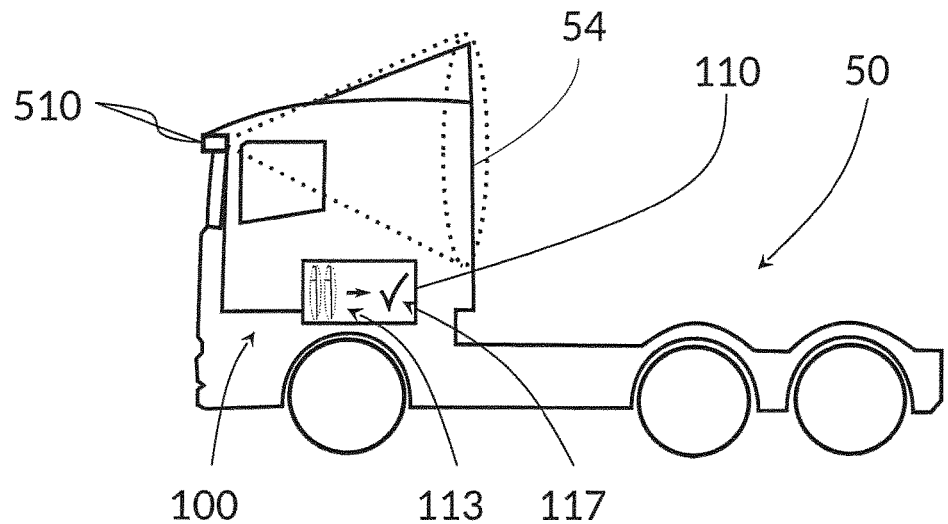
FIG. 1 depicts an apparatus for validating a position or orientation of a sensor of an autonomous vehicle.

FIG. 1 depicts an apparatus 100 for validating a position or orientation of a sensor of an autonomous commercial trailing vehicle 50. The vehicle 50 comprises a sensor 510, which in the present embodiment is a rear-facing camera whose field of view is indicated by emerging dashed lines. The sensor 510 provides consecutive sensor data—in this case, a camera image—of surroundings of the vehicle 50. The sensor data in particular comprises a pattern originating from an edge 54 of the vehicle. The apparatus 100 is configured to access the sensor data, and comprises a validation module 110 configured to perform a comparison 113 of the consecutive sensor data, and a validation 117 of a position or orientation of the sensor based on a deviation in the consecutive sensor data, which in this embodiment is a location of the edge 54 within the image conveyed by the sensor data.

Figure 2:
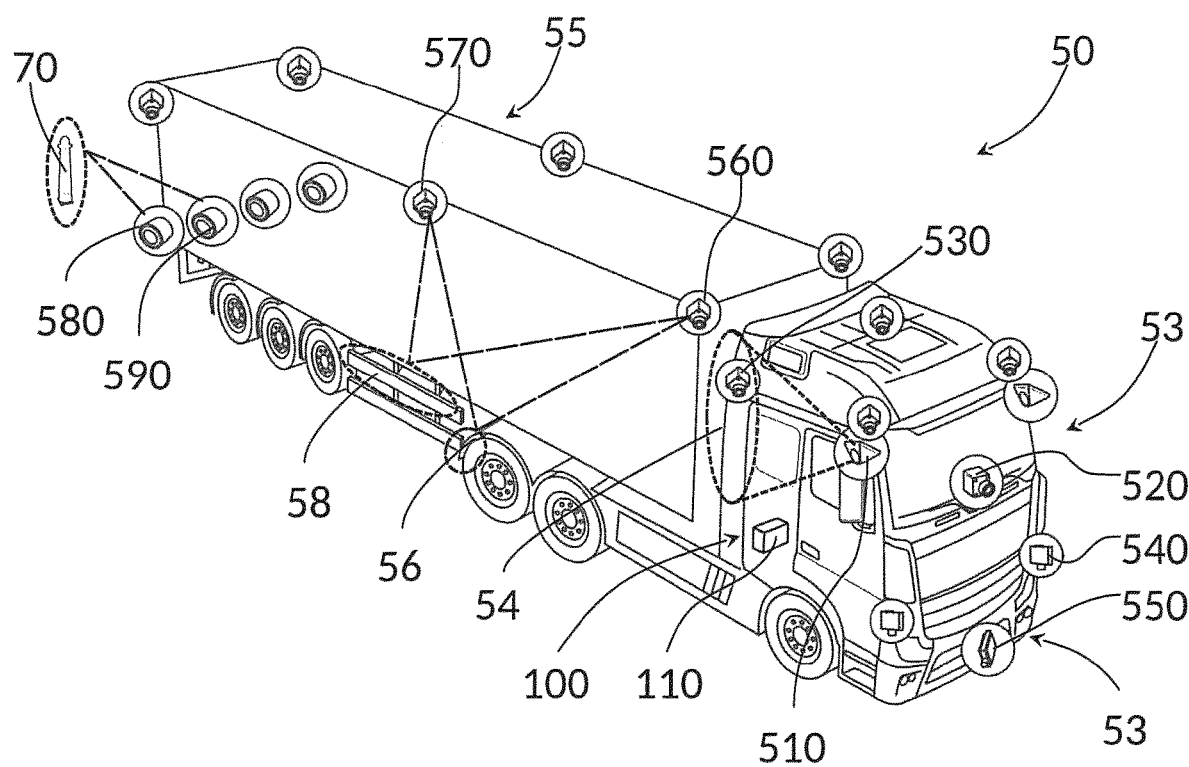
FIG. 2 depicts a more detailed embodiment of an apparatus for validating positions or orientations of several sensors present on an autonomous commercial vehicle.

FIG. 2 shows an embodiment of an apparatus 100 for validating positions or orientations of sensors 510, 520, . . . , typically present on an autonomous commercial vehicle 50. The vehicle 50 comprises a towing vehicle with a cabin 53 and a vehicle frame 55, and a trailer 57. The cabin comprises in particular a rear-facing camera 510, a forward-facing camera and radar 520, and a surround-view fish-eye camera 530, among others. The vehicle frame in particular hosts a wide-angle radar sensor 540 centered around a forward direction, and a similar radar sensor 550 for a lateral direction, with an overlap of their respective fields of view. The trailer comprises several more fish-eye cameras 560, 570, which together with the fish-eye cameras 530 on the cabin provide a surround view of the vehicle in multiple coverings. Furthermore, a couple of rear-facing lidar sensors 580, 590 are depicted on the trailer. Trailer and/or trailing vehicle may comprise further sensors not detailed in this figure.

The sensors on the vehicle, including the mentioned sensors 510, 520, . . . repeatedly provide respective sensor data for a variety of autonomous and automatized driving tasks. The sensor data are tapped by the apparatus 100 and provided to a validation module 110. The validation module 110 in this embodiment is configured as a single data processing unit, but may also be spread over several such units, or to various degrees combined with existing electronic control units of the vehicle 50.

In the present embodiment, the validation module 110 compares and validates sensor data in several ways. One way is by storing data of an individual sensor, possibly including sensor calibration information, and comparing present data of that sensor with said stored data in order to recognize deviations attributable to sensor misalignment or displacements. For example, images of the rear-facing camera 510 installed on the cabin 53 may be compared with previous such images, and a localization of a structural pattern of the cabin 53, like e.g. the position of an edge 54, may be evaluated. If the position of the edge 54 in the compared images deviates to a degree above a certain threshold, a warning about an inaccurate orientation of the rear-facing camera 510 may be issued e.g. to a driver, to a superordinate system of the autonomous vehicle 50, or to a place remote from the vehicle 50, like e.g. a workshop. The structural pattern, here the vehicle edge 54, is observed on a part of the vehicle 50 (the cabin 53) which is in rigid connection with the sensor, here the rear-facing camera 510.

As another way, positions or orientations of sensors directly observed by other sensors on the vehicle may be validated directly. In the depicted embodiment, the fish-eye camera 530 appears in the image of the rear-facing camera 510, and the image of the rear-facing camera 510 may therefore serve for directly detecting deviations in the position or orientation of the fish-eye camera 530. Again, a rigid connection between the sensors, as here for the rear-facing camera 510 and the fish-eye camera 530, is advantageous.

Another way involves features either on or off the ego vehicle 50 which are simultaneously observed by at least two different sensors. Relative localizations of such features in the sensor data of different sensors can be compared and validated. In such cases, a suitable pattern recognition could even allow an exploitation of merely transiently visible features.

For example, the two fish-eye cameras 560, 570 may both provide an aspect of a rear mudguard of the vehicle frame 55 of the trailing vehicle, e.g. in a curve or in other situations where there is an angle between trailing vehicle and trailer 57. A difference between localizations of an edge of the mudguard in the images provided by the two respective cameras 560, 570 could be compared to a previously determined such difference, with a change signaling at least a potential displacement of one of the two cameras 560, 570. Other features of the vehicle may be employed either alternatively or as a cross-check. The fish-eye cameras 560, 570 are rigidly connected to the trailer, and an angle under which the two cameras 560, 570 observe structures of the trailer 57, such as e.g. a point on the lateral underrun protection 58, may serve as a more steady mark for a monitoring of sensor calibration than structure on the mudguard of the trailing vehicle.

The validation module may also be configured to employ objects or markings away from the vehicle. This can be particularly advantageous for sensors which do not feature vehicle structure in their respective sensor data. In the present embodiment, a situation is depicted in which two of the rear lidar sensors 580, 590 both localize a particular street bollard 70 in their respective field of view, which may be employed for determining a difference in the angle between the lines of sight of the two lidar sensors 580, 590. Comparing this to previous or calibration data for the two lines of sight, which in particular may have been obtained from a different object than the depicted pollar, can serve for monitoring the calibration of the two lidar sensors 580, 590. Objects serving for orientation in traffic may be particularly advantageous for such a validation, especially if their recognition in the sensor feed is already effectuated in the context of other automatic driving tasks, and may merely be exploited for calibration validation.

Similar checks of position or orientation as those described above may furthermore be configured for the forward-facing camera 520, for the wide angle radar sensors 530, 540, and for other sensors on the vehicle 50.

Figure 3:
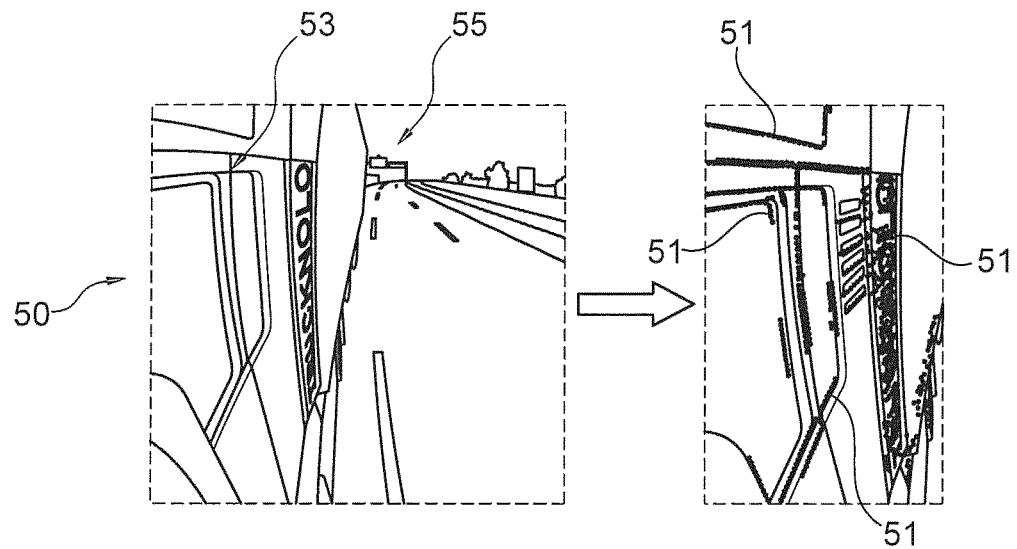
FIG. 3 illustrates an overlaying of features in sensor data for comparison and validation of a position or orientation of a sensor.

FIG. 3 illustrates an overlaying of features in sensor data as an embodiment for comparison and validation of a position or orientation of a sensor (e.g. the rear-facing camera 510) on a commercial vehicle 50. On the left of this figure, an image captured by an exteroceptive rear-facing sensor, such as e.g. a mirror replacement sensor, is displayed, including parts of the commercial vehicle 50 with a cabin 53 and a trailer 55.

According to embodiments patterns 517 of the cabin 53 (or the trailer 55) are used for the validation of the correct position or orientation of the exemplary camera. In this embodiment, patterns 517 include various edges/grooves of the cabin 53 and an inscription or a label (e.g. an advertisement writing or logotype), which can be stored as a pattern structure with a correct orientation. The validation module may in particular be configured to perform a pattern recognition, for which several methods or algorithms are known. The validation can then be performed by overlaying a current with the stored pattern structure, and to verify whether the images match, e.g. by verifying that the various edges/grooves in the captured current image and in stored pattern structure are at the same position. This is shown on the right-hand side, wherein only an excerpt of the image with highlighted structural features 517 is displayed originating from grooves on the vehicle cabin and advertisement writing. Positions of these structural features 517 can be compared with corresponding positions also in subsequent images in order to validate the alignment of the exemplary camera. Validation may involve a threshold or a tolerance, in translational and/or rotational degrees of freedom, for the deviation, and the validation module may be configured to send in information and/or trigger a warning for e.g. a driver, a superordinate system, or a destination remote from the vehicle, like e.g. a workshop.

Figure 4:
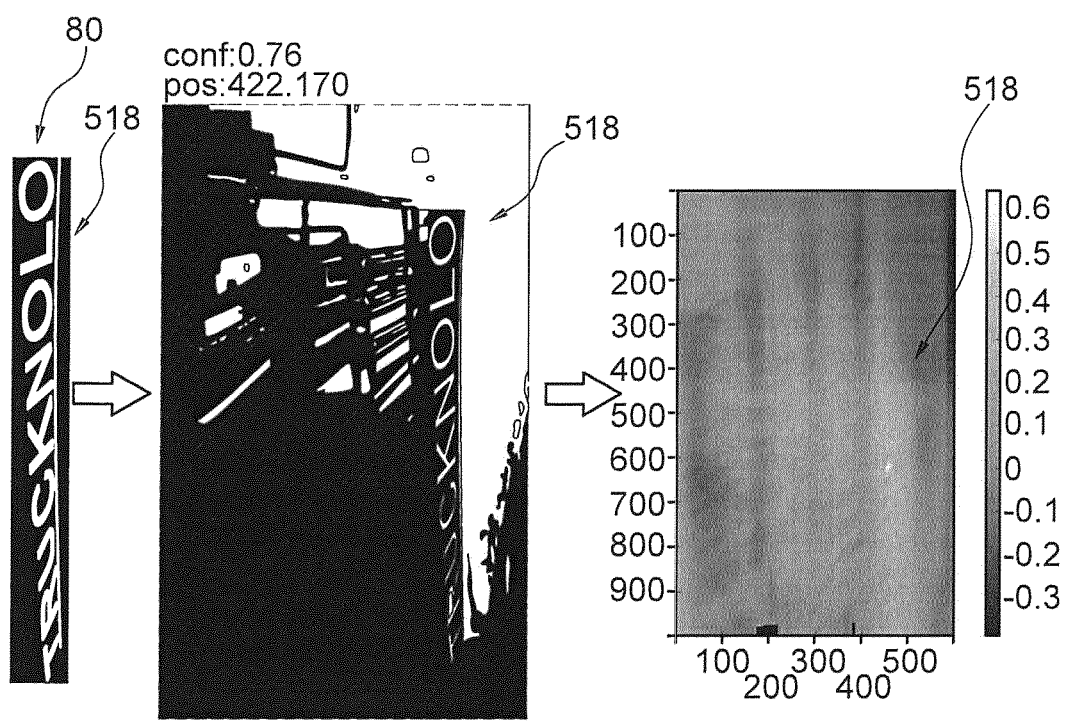
FIG. 4 illustrates a comparison of sensor data by template matching for online validation from correlation changes in the feed of a sensor.

FIG. 4 illustrates a comparison of sensor data in the validation module by template matching for online validation from correlation changes in the feed of the exteroceptive rear-facing sensor 510 of FIG. 3. Methods of pattern matching can include matching sensor data with data from a template, for which the validation module can obtain input data e.g. via vehicle-to-infrastructure or mobile communication. In the present figure, a pattern matching algorithm performed by the validation module recognizes a logotype 518 by way of a template 80 obtained by vehicle-to-infrastructure or mobile communication. The term pattern matching is understood broadly, and may also include methods for thermal patterns. The right-hand side of the figure shows a matching intensity map of a particular structure in the image. Points or pixels on such a map are drawn according to a color or intensity code, where higher values represent a better matching of two compared images. Depicted is an exemplary case in which parts of the logotype 518 are matched for a current sensor image (the middle image) and a stored calibration reference structure (the image to the left), according to a code displayed on the right of the figure.

Figure 5:
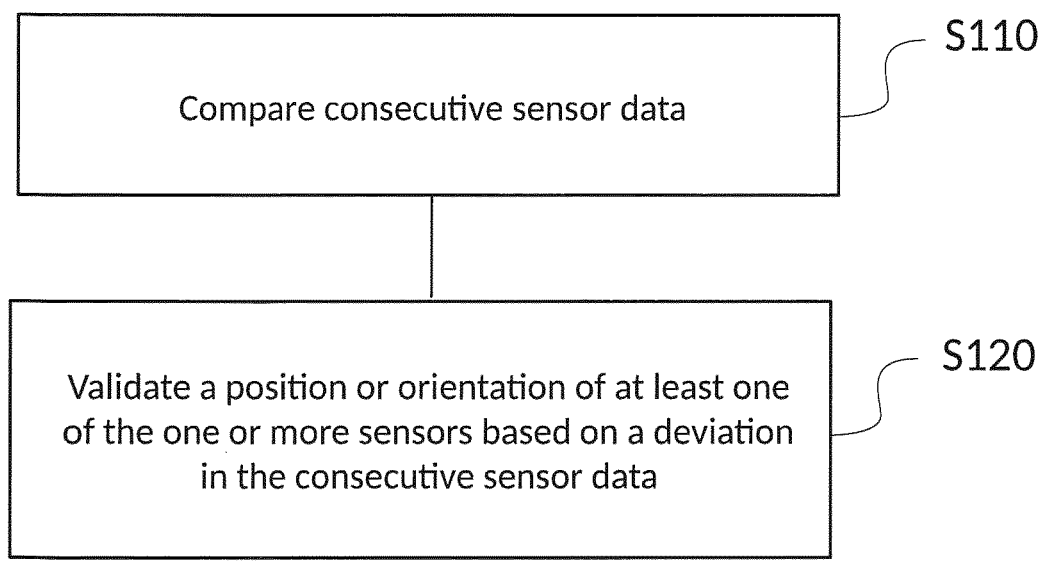
FIG. 5 shows steps of a method for validating a position or orientation of a sensor of an autonomous vehicle.

FIG. 5 shows steps of a method for validating a sensor position of an autonomous vehicle 50, the vehicle 50 comprising one or more sensors for providing consecutive sensor data of surroundings of the vehicle. A first step of this method comprises comparing S110 consecutive sensor data. This comparison S110 can be performed for sensor data provided by an individual sensor at different points in time, and/or for sensor data provided by different sensors both at the same time and at different times. Comparing S110 consecutive sensor data can in particular also involve calibration data. On-vehicle environment perception sensors, as e.g. a video camera, may be employed to crosscheck proper position and orientation of the sensors and of other sensors on the vehicle by using own/ego vehicle geometry and texture to find features and compare them to the earlier calibrated sensor signals in order to detect changes.

This method may also be a computer-implemented method. A person of skill in the art would readily recognize that steps of various above-described methods may be performed by programmed computers. Embodiments are also intended to cover program storage devices, e.g., digital data storage media, which are machine or computer readable and encode machine-executable or computer-executable programs of instructions, wherein the instructions perform some or all of the acts of the above-described methods, when executed on the computer or processor.

The description and drawings merely illustrate the principles of the disclosure. It will thus be appreciated that those skilled in the art will be able to devise various arrangements that, although not explicitly described or shown herein, embody the principles of the disclosure and are included within its scope.

Furthermore, while each embodiment may stand on its own as a separate example, it is to be noted that in other embodiments the defined features can be combined differently, i.e. a particular feature described in one embodiment may also be realized in other embodiments. Such combinations are covered by the disclosure herein, unless it is stated that a specific combination is not intended.

Functions of various elements shown in the figures, when provided by a processor, may be provided by a single dedicated processor, by a single shared processor, or by a plurality of individual processors, some of which may be shared. Moreover, explicit use of the term "processor" or "electronic control unit" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

LIST OF REFERENCE SIGNS 50 vehicle
53 cabin of a towing vehicle (tractor)
54 edge
55 vehicle frame of a towing vehicle
56 rear mudguard of vehicle frame
57 trailer
58 underrun protection of trailer
70 street bollard
80 logotype template
100 apparatus for validating a position or orientation of a sensor
110 validation module
113 comparison of consecutive sensor data
117 validation of a sensor position
510 rear-facing camera
517 structural feature of vehicle in sensor data
518 logotype on vehicle in sensor data
520 forward-facing camera and radar
530 surround-view fish-eye camera on cabin
540, 550 wide-angle radar sensors on towing vehicle frame
560, 570 surround-view fish-eye cameras on trailer
580, 590 rear-facing lidar sensors on trailer
S110, S120 steps of a method

The invention claimed is:

1. An apparatus for validating a position or an orientation of one or more sensors of an autonomous vehicle, the one or more sensors providing consecutive sensor data of surroundings of the vehicle, the apparatus comprising:
    a validation module configured to compare the consecutive sensor data, and
    to validate a position or an orientation of at least one sensor of the one or more sensors based on a deviation in the consecutive sensor data, wherein: the validation module is configured to find a structural feature of the vehicle in surroundings of the sensor by localizing the feature as a pattern in the sensor data by way of a pattern recognition algorithm,
    the validation module is further configured to issue a warning to alert a driver or a workshop to correct the deviation,
    the one or more sensors are multiple sensors providing a surround view of the vehicle in multiple coverings and the structural feature of the vehicle is observed by at least two different sensors, and
    the validation module is configured to validate a position or an orientation of one sensor of the multiple sensors by sensor data of another sensor of the multiple sensors and by comparing a difference between localizations of the structural feature of the vehicle in the sensor data provided by the at least two different sensors to a difference determined previously.

2. The apparatus of claim 1, wherein:
the consecutive sensor data includes calibration data indicating a correct position or orientation of the at least one sensor, and
the validation module is configured to compare present sensor data with the calibration data.

3. The apparatus of claim 1, wherein:
the vehicle is a commercial vehicle comprising a cabin on a vehicle frame,
the one or more sensors include at least one sensor on the cabin and/or at least one sensor on the vehicle frame, and
the validation module is configured:
to localize the structural feature on the cabin when the at least one sensor is positioned on the cabin, and/or
to localize the structural feature on the vehicle frame when the at least one sensor is positioned on the vehicle frame.

4. The apparatus of claim 1, wherein:
the vehicle is a commercial vehicle combination comprising a towing vehicle and a trailer,
the one or more sensors include at least one sensor on the towing vehicle and/or at least one sensor on the trailer, and
the validation module is configured:
to localize the structural feature on the towing vehicle when the at least one sensor is positioned on the towing vehicle, and/or
to localize the structural feature on the trailer when the at least one sensor is positioned on the trailer.

5. The apparatus of claim 1, wherein: the one or more sensors comprise at least two sensors, and the validation module is configured to compare consecutive sensor data provided by one of the at least two sensors with consecutive sensor data provided by another of the at least two sensors.

6. A vehicle comprising:
the one or more sensors for providing the consecutive sensor data of the surroundings of the vehicle in order to perform automated driving tasks, and
the apparatus according to claim 1.

7. The vehicle of claim 6, wherein: the vehicle is a commercial vehicle with or without a trailer.

8. The vehicle of claim 6, wherein:
the one or more sensors comprise one or more of:
a mirror replacement sensor,
a downward-facing camera,
a front-facing camera,
a surround-view camera,
a radar sensor,
a lidar sensor, or
an ultrasonic sensor.

9. A method for validating a sensor position of an autonomous vehicle, the vehicle comprising one or more sensors for providing consecutive sensor data of surroundings of the vehicle, wherein the one or more sensors are multiple sensors providing a surround view of the vehicle in multiple coverings and a structural feature of the vehicle is observed by at least two different sensors,
the method comprising:
comparing the consecutive sensor data;
validating a position or an orientation of at least one of the one or more sensors based on a deviation in the consecutive sensor data, based on finding the structural feature of the vehicle in surroundings of the sensor by localizing the feature as a pattern in the sensor data by way of a pattern recognition algorithm; and
issuing a warning to alert a driver or a workshop to correct the deviation,
wherein the validating includes validating a position or an orientation of one sensor of the multiple sensors by sensor data of another sensor of the multiple sensors and comparing a difference between localizations of the structural feature of the vehicle in the sensor data provided by the at least two different sensors to a difference determined previously.

10. A computer product comprising a non-transitory computer readable medium having stored thereon program code which, when executed on a processor, carries out the method of claim 9.

* * * * *